2 Sheets--Sheet 2.
P. M. CHURCH.
Apparatus for Leaching and Concentrating Bark Extracts.
No. 140,469. Patented July 1, 1873.
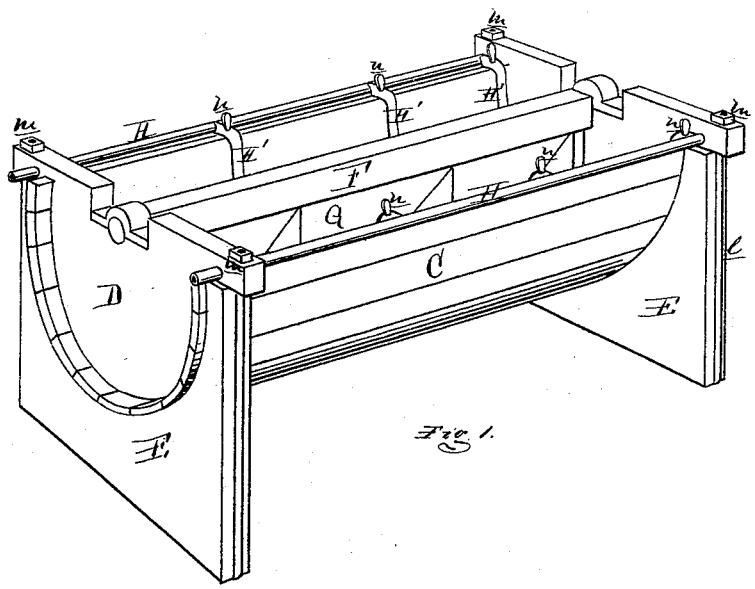
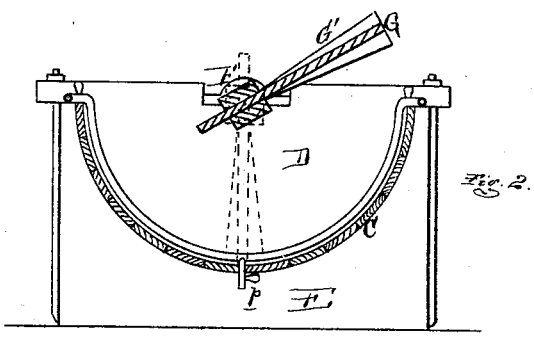
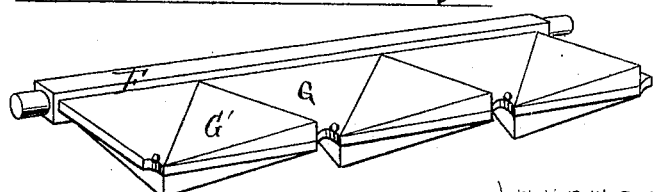

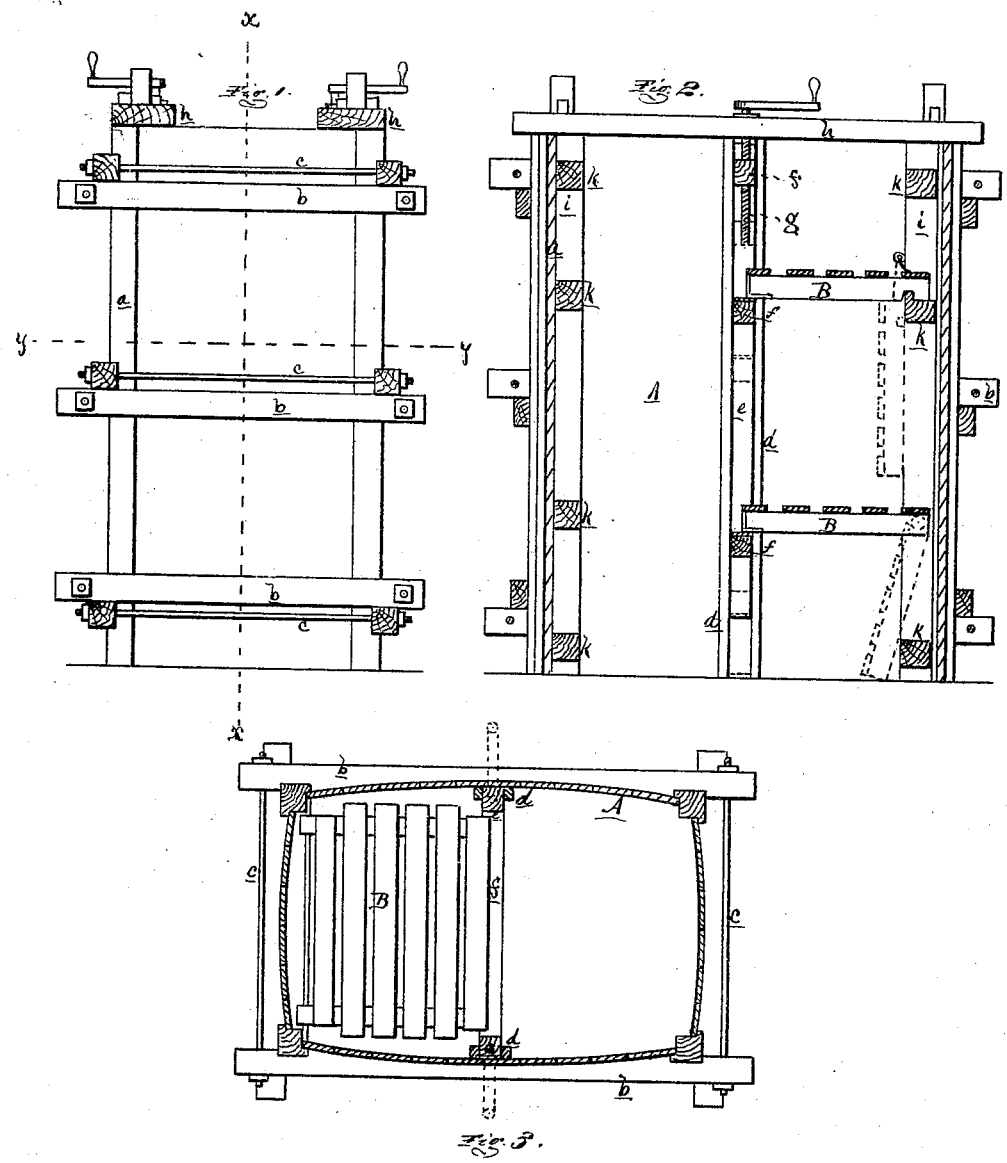

UNITED STATES PATENT OFFICE.

PHILETUS M. CHURCH, OF SAULT DE STE. MARIE, MICHIGAN, ASSIGNOR TO HIMSELF AND PHILETUS S. CHURCH, OF SAME PLACE.

IMPROVEMENT IN APPARATUS FOR LEACHING AND CONCENTRATING BARK EXTRACTS.

Specification forming part of Letters Patent No. 140,469, dated July 1, 1873; application filed April 2, 1873.

*To all whom it may concern:*

Be it known that I, PHILETUS M. CHURCH, of Sault de Ste. Marie, in the county of Chippewa and State of Michigan, have invented a new and useful Improvement in Apparatus for Leaching and Concentrating Bark Extracts; and I do declare that the following is a true and accurate description thereof, reference being had to the accompanying drawings and to the letters of reference marked thereon and being a part of this specification, in which—

Figure 1, Sheet 1, is an end elevation of my improved leach. Fig. 2 is a longitudinal vertical section on the line $x\,x$ in Fig. 1. Fig. 3 is a horizontal section on the line $y\,y$ in Fig. 1.

Fig. 1, Sheet 2, is a perspective view of my evaporator. Fig. 2 is a cross-section of the same. Fig. 3 is a detached perspective view of the vibrating agitator.

The nature of this invention relates to an improvement in apparatus for leaching and concentrating the astringent solution of barks and of boughs of such woods as contain a considerable percentage of tannin. The invention consists, first, in the peculiar construction of the leach, which is provided with several leaching-grates, each of which supports a portion of the mass of bark, whereby the packing of the mass is obviated, and no obstruction to the percolation results; the grates are so hung and supported that they may be dumped to empty the leach when the astringent properties are extracted; second, in the peculiar construction of the evaporator for concentrating the fluid extract, as more fully hereinafter set forth.

In the drawing, A represents the leach-tank composed of vertical staves matched together and springing from four corner-posts, $a$, held together by wooden yoke-timbers $b$ and iron tie-rods $c$ passed through their ends. The sides and ends of the leach-tank are bilged to form segments of circles in cross-section, which not only gives the structure great strength, but by screwing up the nuts on the ends of the tie-rods the tank can easily be kept water-tight, as shown. The tank is open at top and bottom. $d\,d$ are two vertical strips running up the middle of each inner side of the leach-tank, forming guides for a pair of vertical slides, $e$, connected by girts $f$ extending from one to the other at intervals. $g\,g$ are screws passing down through the middle of the top girts $h\,h$, and are tapped into nuts in the upper girt $f$, each screw being provided with a crank, by which the frame composed of the slides $e$ and girts $f$ may be raised and lowered. Inside the tank, at each corner, is a post, $i$. These posts of each end are connected by girts $k$, which, with the top-girts $h$, keep the said posts in place. B are grates, each resting at its outer end upon a girt, $k$, or hinged by a rod to the posts $i$, as may be preferred, while their inner ends rest upon the girts $f$ of the sliding frame. The ground bark or finely-cut boughs are placed on the grates until the tank is full, when the leaching is proceeded with by allowing small streams of water to slowly percolate through the mass. By subdividing the mass into shallow bodies there is less tendency to pack and obstruct the percolation than in the form of leach heretofore employed. When the astringent properties have been fully extracted from the mass the latter is quickly dumped by revolving the screws until the girts $f$, which support the inner ends of the grates, are lowered until they are tangent to said grates, which drop down, as shown in dotted lines in Fig. 2, and discharge the leached bark through the bottom of the tank, thereby avoiding the slow and laborious task of shoveling out the mass from the top of the tank, as has heretofore been necessary. By subdividing the mass every part is exposed uniformly to the action of the percolating fluid, which insures a more thorough extraction of the tannin, while the process is more rapid than it could otherwise be, therefore requiring a lesser number of leaches to supply a given quantity of extract per day.

In Sheet 2 is represented my improved evaporator in which the leached extract is concentrated to the required strength and consistency for market. C is a semi-cylindrical trough built up of wooden staves inclosed at the ends by semicircular heads D, the ends of the trough resting in strong wooden cradles E shaped to receive them. A U-shaped iron tie-rod, $l$, extends under the bottom of each cradle and up its sides, passing through a projection at each end of the head D, where its ends receive a screw-nut, m, by means of which the staves, heads, and cradles are firmly bound together, and all leakage prevented. In the axis of the trough a wooden shaft, F, is journaled in the heads, carrying a wooden bucket or blade, G, extending the full length of the trough and sweeping its bottom. To the shaft is imparted an oscillatory movement sweeping through an angle of about two hundred and forty degrees through a rocker-arm at one end of the shaft, or by any equivalent means. A steam-pipe, H, extends along the top edge of each side of the trough, which pipes are connected at intervals by a number of transverse pipes, H', lying on the bottom of the trough. Each transverse pipe may be provided with a valve, h, if desired, to regulate the flow of steam through it, and consequently the temperature of the extract, which should not exceed 180° Fahrenheit. The outer edge of the blade G is recessed, as at o, to embrace each transverse pipe, so as to allow the edge of said blade to sweep almost in contact with the bottom of the trough, and thereby agitate the entire volume of extract contained therein, obviating any tendency of the extract to scorch, which might easily result if allowed to lie quiescent in the bottom of the trough. G' are triangular wedge-shaped blocks secured to the sides of the blade G, those of one side facing in one direction while those on the other side face in the other direction. In the oscillation of the blade in one direction these blocks impart a longitudinal impulse to the extract toward one end of the trough, while in the return stroke they impart a reverse impulse to the extract, so that its entire volume is agitated and changed in every direction at each oscillation of the blade. The motion of the blade is slow, and each time it rises above the liquid it carries a portion thereof with it, which spreads over its entire surface in a thin film exposed to the atmosphere, which causes the lighter hydrates to be rapidly evaporated until the extract is concentrated to the required strength and consistency.

As iron by its oxidizing influence upon the extract tends to darken the latter in color and lessen its commercial value, I employ brass tubes through which to circulate the steam which keeps the extract heated to the required temperature, and avoid the use of iron in the internal construction of the apparatus as far as possible. Each transverse pipe should be fitted with a cock, p, in its lowest part tapped through the bottom stave of the trough to draw off the water of condensation before admitting steam thereto.

What I claim as my invention, and desire to secure by Letters Patent, is—

1. The leach-tank A, constructed substantially as herein described, and provided with the hinged sectional grates B, the slides e e, girts f f, and screws g g, arranged and operating substantially as and for the purpose set forth.

2. The construction and arrangement of the evaporating-trough C, heads D secured in the cradles E by the tie-rods l, the oscillating shaft F carrying a blade, G, with the agitating-blocks G' secured thereto, substantially as and for the purpose set forth.

PHILETUS M. CHURCH.

Witnesses:
H. F. EBERTS,
H. S. SPRAGUE.